United States Patent

Baracchi et al.

[11] Patent Number: 5,259,953
[45] Date of Patent: Nov. 9, 1993

[54] FUEL FILTER EQUIPPED WITH A QUICK FASTENING COVER FOR AN INTERNAL COMBUSTION ENGINE

[75] Inventors: Fabrizio Baracchi, Turin; Silvano Casalicchio, Bruino; Mauro Gallino, Grugliasco; Luigi Tarditi, Pinerolo, all of Italy

[73] Assignee: Gilardini S.p.A., Italy

[21] Appl. No.: 739,239

[22] Filed: Aug. 1, 1991

[30] Foreign Application Priority Data

Aug. 8, 1990 [IT] Italy ................. 67627 A/90

[51] Int. Cl.$^5$ ................................ B01D 27/08
[52] U.S. Cl. .................... 210/232; 210/439; 210/440; 210/455; 210/DIG. 17; 210/309
[58] Field of Search ............ 210/232, 238, 307–309, 210/437–439, 440, 455, DIG. 17, 443, 444, 453; 215/329, 330

[56] References Cited

U.S. PATENT DOCUMENTS

| | | | |
|---|---|---|---|
| 2,372,570 | 3/1945 | Hallenius et al. | 210/443 |
| 2,567,062 | 9/1951 | Edelen | 285/81 |
| 3,433,380 | 3/1969 | Kawchitch | 215/329 |
| 3,448,896 | 6/1969 | Kobayashi et al. | 285/92 |
| 4,617,118 | 10/1986 | Smart | 210/232 |
| 4,743,374 | 5/1988 | Stifelman | 210/440 |
| 4,853,120 | 12/1989 | Frantz | 210/439 |
| 4,940,260 | 7/1990 | Odriozola | 285/92 |
| 4,992,166 | 2/1991 | Lowski et al. | 210/232 |
| 5,000,332 | 3/1991 | Whitacre | 215/330 |
| 5,063,968 | 11/1991 | Bartholomew | 285/272 |

FOREIGN PATENT DOCUMENTS

| | | | |
|---|---|---|---|
| WO90/05009 | 3/1990 | PCT Int'l Appl. | 210/437 |
| 847332 | 9/1960 | United Kingdom | 215/330 |
| 2220866 | 1/1990 | United Kingdom | 210/440 |

Primary Examiner—Matthew O. Savage
Attorney, Agent, or Firm—Bacon & Thomas

[57] ABSTRACT

A filter comprises a case for a fuel filter element and a cover that can be built according to two embodiments: one with holes for allowing the screwing of the filter onto a threaded base; and one with elbow-ducts projecting from the cover and integrally formed therewith. Both the cover and the case are of plastic material. The fastening of the cover to the case is obtained by means of a helical screw connection and a locking means, the locking means consisting of oblique teeth both in the case and in the cover acting as a ratchet gear arrangement for preventing unscrewing of the cover. A settlement chamber is formed at the bottom of the case having radial projections reinforcing the structure thereof.

9 Claims, 5 Drawing Sheets

FIG. 10
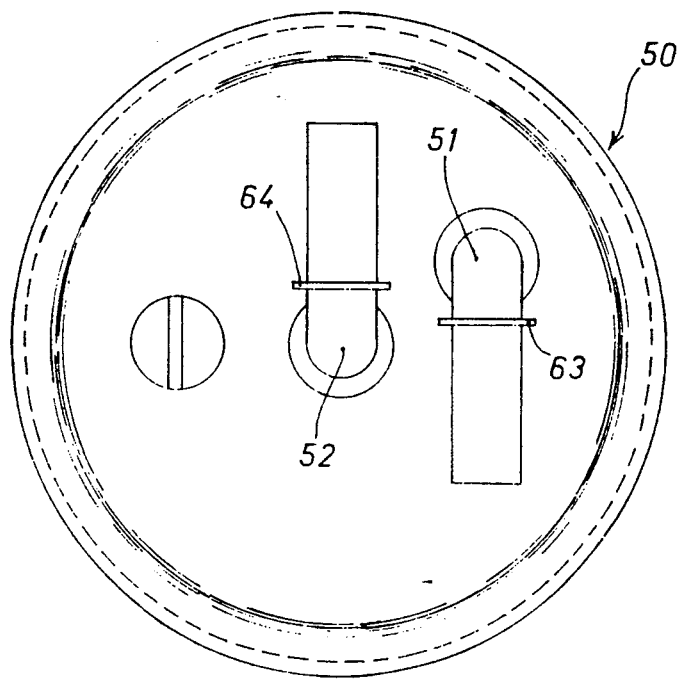
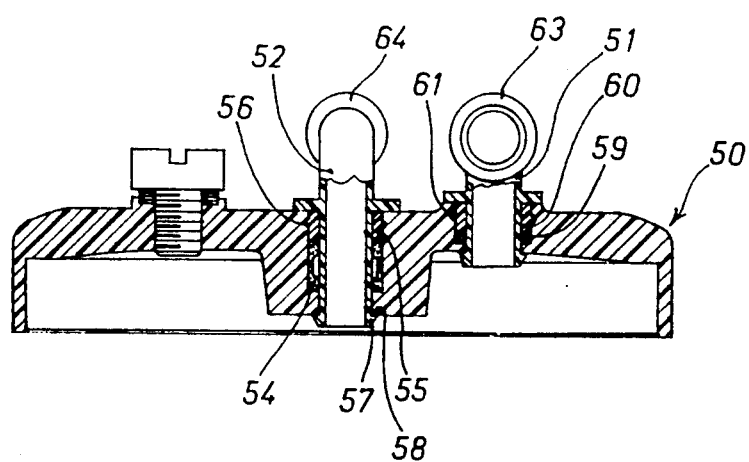
FIG. 11

FUEL FILTER EQUIPPED WITH A QUICK FASTENING COVER FOR AN INTERNAL COMBUSTION ENGINE

BACKGROUND OF THE INVENTION

The present invention relates to a fuel filter for an internal combustion engine, equipped with a quick fastening cover.

There are known several fuel filters, particularly filters for feeding gas oil to internal combustion engines, mainly of motor vehicles.

Since these devices are to be mass-produced, both for the original equipment of motor vehicles and as spare parts, it is important to reconcile the product reliability and quality with a low manufacturing cost thereof.

A fuel filter for internal combustion engines is disclosed in Italian Utility Model Application No. 53316-B/88 in the name of the present Applicant. In such a type of filter a paper filter element is housed within a plastic cylindrical case to be screwed onto a suitably threaded connection provided in the engine. The case is closed by a cover having a number of holes for the fuel passage and suitable seals. The cover is fastened to the case upper lip by means of a welding and in order to allow this latter corresponding grooves are formed in the case and in the cover to collect the so produced swarf material.

This solution has some drawbacks both for what concerns the product quality and the manufacturing cost thereof.

The object of the present invention is that of overcoming or at least reducing the drawbacks of the known filters, by providing a fuel filter for an internal combustion engine wherein the cover can be fastened to the case through a simple and easy operation, without thermal treatments.

Another object of the invention is that of providing a fuel filter adapted to be made in two alternative embodiments, one of the type to be screwed onto a suitable fix or connection (spin-on), and the other of the type connectible to the fuel supply line through ducts, both embodiments incorporating a common main structure.

SUMMARY OF THE INVENTION

The above and other objects and advantages of the invention as will be clear from the rest of the description, are achieved by a fuel filter for an internal combustion engine comprising a plastic material cylindrical case housing a filter element above a settlement chamber defined at the case bottom, and a cover also of plastic material for closing said case, provided with fuel inlet openings and fuel outlet openings, characterized in that said case terminates with an upper collar provided with helical screwing means adapted to cooperate with complementary helical screwing means on the collar of the cover, and in that said screwing means are both associated with clamping oblique teeth for the permanent locking of said cover to said case.

An additional characteristic of the filter according to the invention is that the case bottom wherein a settlement chamber for the fuel is formed is provided with a series of radial projections that stiffen the structure and are integrally formed with the case, defining upwardly a rest plane for said filter element.

BRIEF DESCRIPTION OF THE DRAWINGS

A preferred embodiment of the invention will now be described with reference to the attached drawings, in which:

FIG. 10 is a part section top plan view of a fourth embodiment of the filter cover of FIG. 3; and FIG. 11 is an axial part section view of the cover of FIG. 10.

DETAILED DESCRIPTION OF THE PREFERRED EMBODIMENTS

Figure 1:
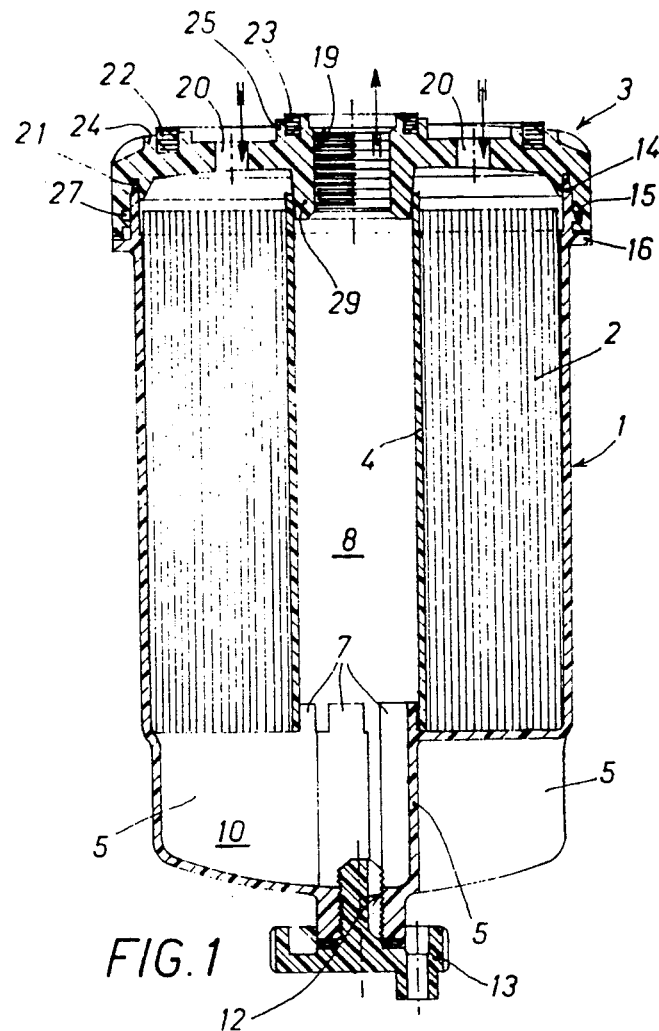
FIG. 1 is an axial cross section view of a first embodiment of the filter according to the invention.

With reference to FIG. 1, there is shown a first embodiment of a fuel filter for engines of vehicles according to the invention. The filter substantially comprises a cylindrical case 1 housing a filter element 2 and closed by a cover 3. Both the case 1 and the cover 3 are of a plastic material having suitable characteristics, in case filled with glass fibers or other substances adapted to increase the mechanical and thermal resistance to the values desired for a specific application. The case and the cover can therefore be inexpensively manufactured by moulding. The filter element 2 is formed by crepe paper wrapped around a central tube 4 as it is known in the art.

Figure 2:
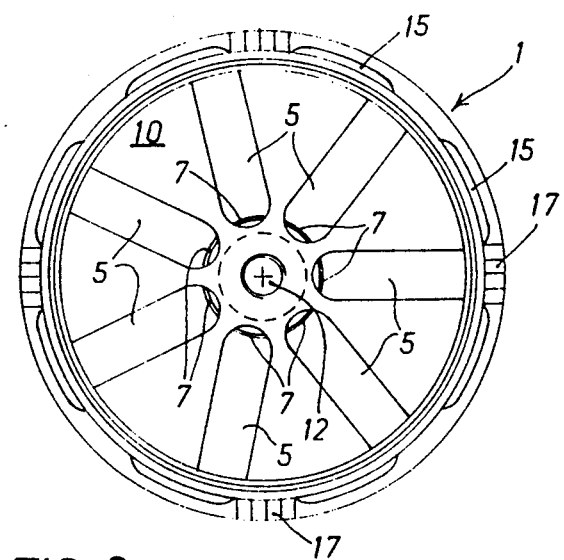
FIG. 2 is a top plan view of the filter of FIG. 1 with the cover taken away.

As shown in FIGS. 1 and 2, the bottom of the case 1 is provided with a series of integral projections 5 raising from the case bottom that extend radially but terminate before the center of the case. Such radial projections stiffen the lower portion of the case structure which is bound to be stressed by compression either manually or by means of a tool when the filter is screwed onto the engine. Since all the projections have the same height, the projections 5 provide a flat resting surface for the filter element 2. To this aim each of the projections 5 comprise an upper rib 7 shaped as a circle arc at the inner end of the projections: the whole of the ribs 7 forms a centering sleeve onto which the filter element 2 is fitted through the axial hole of the tube 4.

Thus a settlement chamber 10 is defined below the filter element 2, at the bottom of which a drain hole 12 is provided that is closed by a screw plug 13.

The case 1 terminates upwards with an inwardly tapered collar 14 adapted to engage a circular groove 21 with a conical cross section in the cover 3, and provided on its outer surface with circumferentially discontinuous helical projections 15 that are relatively short and inclined. In correspondence with the end portion of each projection 15 an array of oblique teeth 17 directed upward is moulded on the rest projection 16, the oblique teeth extending between each helical projection 15.

The case 1 is watertight sealed by a cup shaped cover 3 provided with inlet and outlet openings for the fuel to be filtered.

Figure 3:
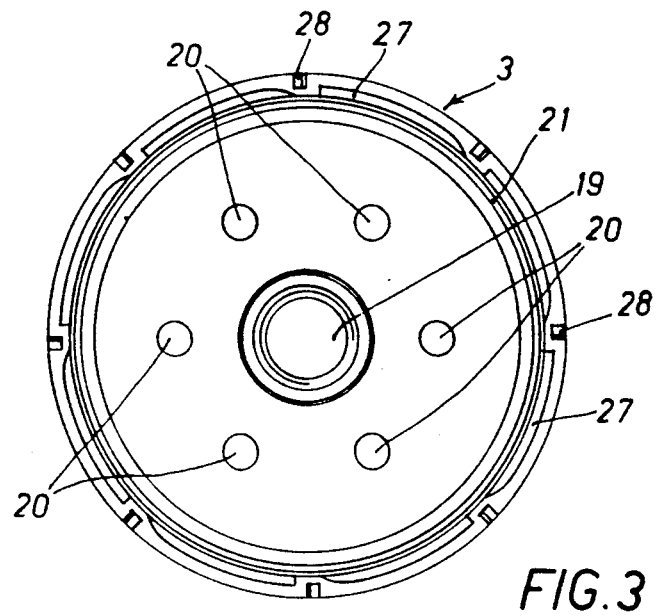
FIG. 3 is a part section top plan view of the filter cover of FIG. 1.
Figure 4:
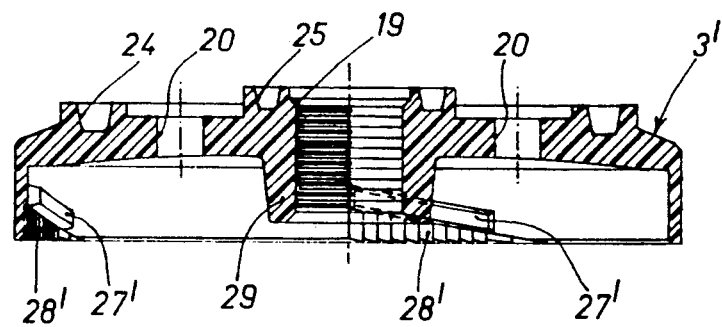
FIG. 4 is an axial cross section of the cover according to an embodiment of the screwing system.

In the embodiment of FIGS. 1, 3 and 4, the cover 3 is of the type allowing for the filter to be screwed onto a threaded fix or connection projecting from the engine or from that portion (not shown) of the fuel supply line to which the filter is to be applied. Therefore the cover is equipped with a central threaded hole 19 also acting as an outlet opening of the filtered fuel. The cove& is further provided with a series of openings 20 eccentrically located on a circle having a diameter that is about one half the cover diameter, acting as inlet openings of the fuel to be filtered. On the outer face of the cover there are provided two annular seal gaskets 22 and 23, the former being outside the holes 20 and the latter being located between the holes 20 and the central hole 19. The gaskets 22 and 23 are forcibly received in circular grooves 24 and 25 ensuring the correct positioning of the gaskets when the filter is screwed onto the threaded fix or connection. Preferably the cross section of the grooves 24 and 25 is in the form of a trapezoid, as shown in FIG. 4.

As indicated, the cover 3 is of the cup shaped type, with the concavity towards the case. Within the cover, along the side wall thereof, there are provided circumferentially discontinuous helical grooves 27 having the same inclination as the threads or helical projections 15 of the case 1. On the collar of the case I there is formed an array of downwardly directed oblique teeth 28, whose direction of inclination (slant) is the same as that of teeth 17 of the case 1. Such construction allows for the cover 3 to be screwed onto the the case 1 by means of a quick movement thanks to the inclination of the projections 15 and the grooves 27 and to the fact that both are relatively short, so that the cover is brought from a starting position to a final position of complete screwing through a fraction of turn. After the screwing has been completed, by imparting a further torsion to the cover, the teeth 28 are driven to move over the back of the teeth 17 of the case, which is possible due to the fact that they both are inclined the same way. After this operation, the fastening of the cover has become positive and irreversible, that is permanent, since the unscrewing thereof is prevented by the ratchet and gear engagement between the two arrays of teeth 17 and the teeth 28 with each tooth 17 acting as a ratchet or pawl with respect to the teeth 28 on the cover so that this latter can no longer be turned in a direction opposed to the one that caused the screwing thereof.

This way it becomes possible to assemble together the case and the cover by means of a simple and quick mechanical operation. When the cover has been fastened, the sleeve 29 defining the axial hole 19 is fitted into the tube 4 (FIG. 1) and thanks to its slightly frusto-conical external configuration, it ensures the seal between the incoming fuel flow through the holes 20 and the outlet fuel flow through the hole 19.

Figure 5:
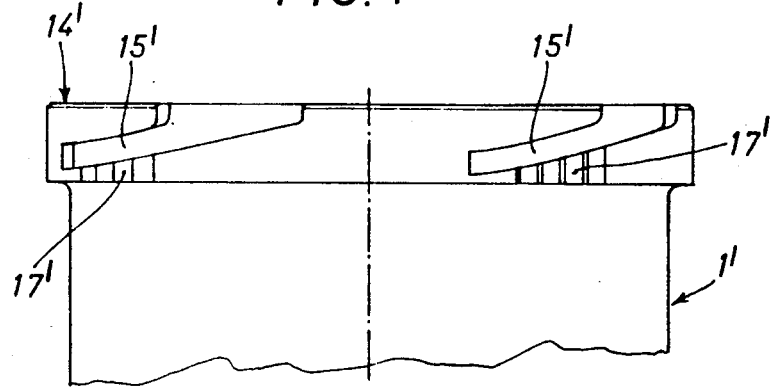
FIG. 5 is a partial view of the case according to an embodiment of the screwing system of FIG. 4.

FIGS. 4 and 5 show an embodiment of the screwing system of the cover to the case obtained by means of helical grooves 15' on the collar 14' of the case 1' below which are located the clamping teeth 17' outwardly directed and by means of relatively short projections 27' and inclined inwardly of the collar of the case under which projections are provided the teeth 28' turned inwardly of the cover and correspondingly oblique with respect to the teeth 17' on the collar of the case.

The operation of the above illustrated filter is well known: the fuel to be filtered, usually gas oil, penetrates the filter through the holes 20 and flows through the filter element 2 reaching the settlement chamber 10. Here the water and other settled impurities to be periodically drained through the hole 12 are collected, then the filter fuel flows upwardly through the axial hole 8 from the tube 4 and comes out through the central hole 19 in the cover 3.

Figure 6:
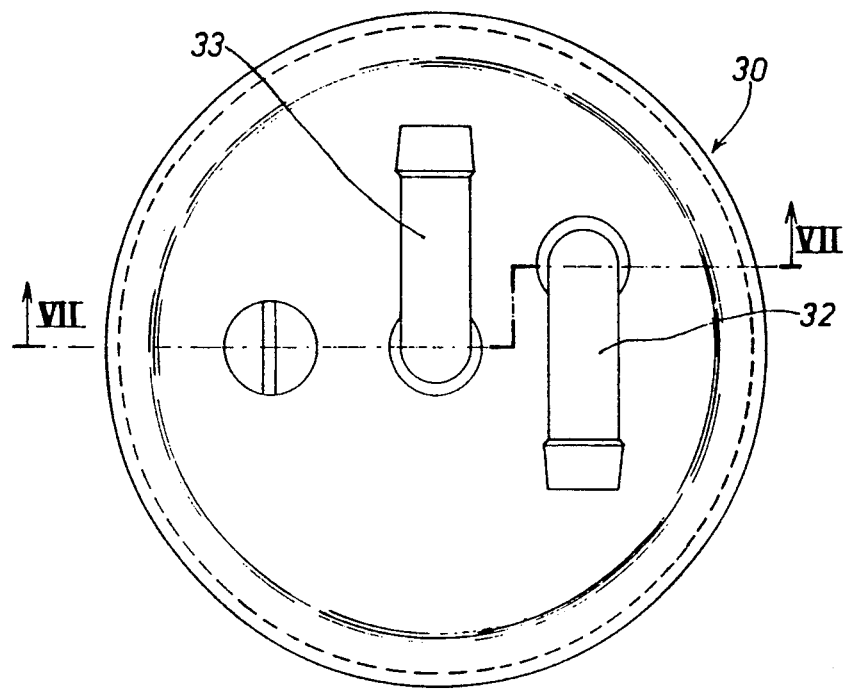
FIG. 6 is a part section top plan view of a second embodiment of the filter cover of FIG. 3.
Figure 7:
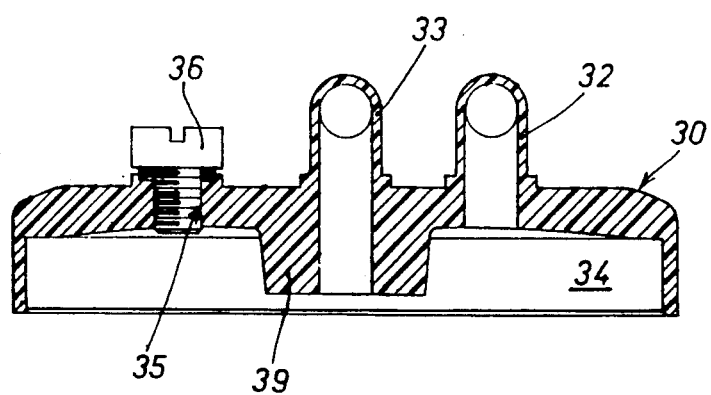
FIG. 7 is a cross section view along line VII—VII of the cover of FIG. 6.

FIGS. 6 and 7 show another embodiment of the filter cover according to the invention, generally designated with 30.

Such cover can be fastened the same way as shown above for the cover 3 to the case I since the portion to be mated with the case is the same in both embodiments. The difference between the cover 30 and the cover 3 is that the cover 30 is provided with elbow ducts 32 and 33 integrally formed with the cover body by moulding, for the fuel inlet into and the fuel outlet from the filter, respectively. Duct 32 opens into the filter chamber 34 over the filter element, whereas duct 33 is located at an axial position aligned with the tube 4 that has already been discussed with reference to the case 1. An air venting hole 35 is further provided for in the cover which is normally closed by a screw 36. A frusto-conical collar or sleeve 39 projecting within the cover is provided for the seal connection between the tube 4 and the case 1.

By assembling together the cover 30 and the case 1 one obtains a filter that needs no longer to be screwed for the connection to the fuel supply line, but rather one that is to be directly connected to the line through the ducts 32 and 33. The connection is achieved by fitting the end portions of the ducts 32 and 33 into the pipes of the fuel supply line and blocking them together by means of hose clamps.

Figure 8:
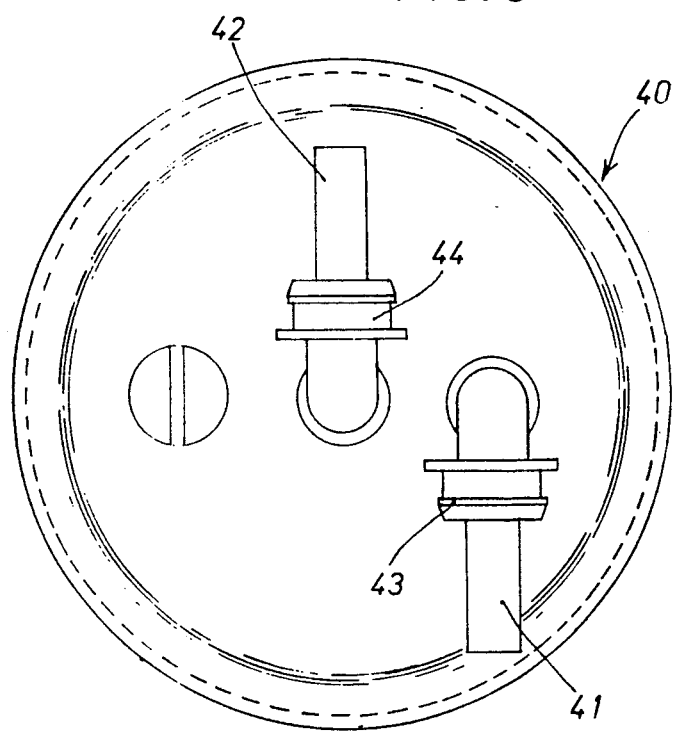
FIG. 8 is a part section top plan view of a third embodiment of the filter cover of FIG. 3.
Figure 9:
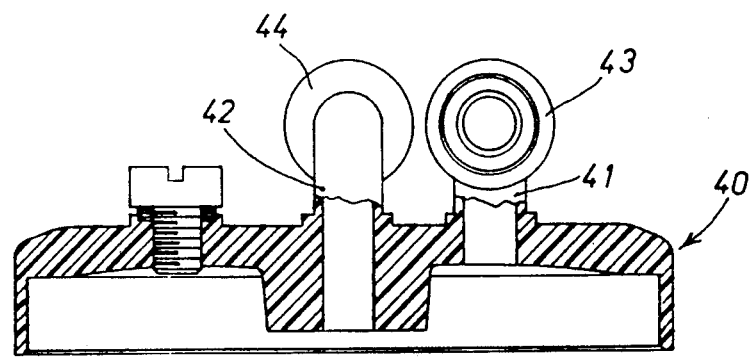
FIG. 9 is an axial part section view of the cover of FIG. 8.

FIGS. 8 and 9 show a third embodiment of the cover generally designated at 40. The cover 40 is different from the, previous illustrated embodiments in that the ducts 41 and 42 comprise quick connect-disconnect couplings. They are provided with portions 43 and 44 adapted to sealingly fitting corresponding portions provided at the ends of the fuel supply pipes (not shown). Such portions include one or more seal gaskets and allow for the pipe fastening by simply press fitting of the portions 43 and 44 of the ducts 41 and 42. Several types of quick connect-disconnect coupling devices are commercially available.

FIGS. 10 and 11 show a fourth embodiment of the cover that is on the whole designate at 50. In this embodiment the ducts 51 and 52 are no longer integrally formed with the cover, but rather separately built and then rotatably mounted on the cover. The cover therefore is provided with two holes having a proper diameter to receive the ducts 51 and 52. In the axial hole into which the outlet duct 52 is fitted there is provided a gasket 54 formed by two sealing ribs held in the proper position by a rigid insert 55 that in turn is equipped with a rib 56 binding the axial position thereof. The lower portion of the duct is slightly conical and is formed with a tooth 58 so as to allow the insertion into the hole and prevent the later extraction thereof. The inlet duct 51 is fitted into the peripheral hole formed in a portion of the cover having a reduced thickness with respect to the central portion. Consequently the gasket 59 is a simple seal ring, e.g. an O ring, again held in position by an insert 60 equipped with a fastening rib 61. The ducts 51 and 52 can be formed with quick coupling connections 63 and 64, or being terminated by conventional components requiring hose clamps for the fastening of the gas oil supply pipes, as shown in FIGS. 6 and 7.

Thanks to the embodiment shown in FIGS. 10 and 11 the elbow ducts 51 and 52 can be radially oriented as desired in order to select the optimum position for mounting the filter in the gas oil supply line to the engine.

There have been disclosed some preferred embodiments of the invention the nevertheless can be subjected to modifications and changes within the scope of the inventive idea.

We claim:

1. A fuel filter for an internal combustion engine comprising:
    a cylindrical case made of plastic material and having axially separated first and second parts located adjacent first and second opposed ends of the case, respectively, a settlement chamber housed in said second part of said cylindrical case, and a case collar proximate the first end of said case, said case having a longitudinal axis;
    a filter element housed in the first part of said cylindrical case;
    a cover made of plastic material and including a peripheral sidewall surrounding an outer surface and said collar, said sidewall including a terminal edge surrounding said case, said cover including fuel inlet and fuel outlet openings;
    wherein an outer peripheral surface of said case collar is provided with a plurality of case connector means extending helically relative to said longitudinal axis for connecting said cover to said case, and including oblique clamping teeth located between said case connector means and said second end;
    wherein an inner surface of said peripheral sidewall of said cover includes a plurality of cover connector means extending helically relative to said longitudinal axis for threadably engaging said case connector means to connect said cover to said case, and including oblique clamping teeth located adjacent said cover connector means;
    wherein said case connector means is arranged and configured to complementarily mate and cooperate with said cover connector means to enable the cover and case to be secured to each other by rotation of either of the case or cover through a partial turn;
    and wherein said oblique clamping teeth of said case collar are arranged and configured to contactly mesh with said oblique clamping teeth of the cover collar for the positive and permanent locking against reverse rotating of the cover to said case.

2. A filter as claimed in claim 1, wherein said case connector means of the case collar and said cover connector means of the cover comprise helical projections that are circumferentially discontinuous, and by circumferentially discontinuous inclined helically extending grooves, respectively, and wherein said oblique clamping teeth of said case collar, associated with said projections, and said oblique clamping teeth of said cover, associated said grooves, are located on said case collar as an array directed toward the first end of the case, and on said cover collar as an array directed toward the second end of the case, respectively.

3. A filter as claimed in claim 2, wherein said case collar includes a tapered terminal upper end portion and said cover has a circular groove with a conical cross section adapted to receive the tapered terminal end portion of the case.

4. A filter as claimed in claim 1, wherein said case connector means of the case collar and said cover connector means of the cover collar are circumferentially discontinuous helical grooves and circumferential discontinuous helical projections, respectively, and wherein said oblique clamping teeth of said case collar, associated with said helical grooves, and said longitudinal axis, and project radially inwardly relative to said longitudinal axis, respectively.

5. A filter as claimed in claim 1, wherein said cover is provided with a fuel inlet duct and a fuel outlet duct that are integrally formed with said cover and are elbow-bent outside the cover.

6. A filter as claimed in claim 5, wherein said inlet and outlet ducts are equipped with quick connect-disconnect coupling means for connection of said inlet and outlet duct to a fuel supply line.

7. A filter as claimed in claim 1, wherein said cover includes a fuel inlet duct and a fuel outlet duct, and means for rotatably mounting said fuel inlet duct and fuel outlet duct with said inlet and outlet openings of said cover.

8. A filter as claimed in claim 7, wherein a said means for rotatably mounting is located between each of the fuel inlet and fuel outlet ducts and inlet and outlet openings, respectively, and each comprises a seal gasket and an insert means for fastening said gasket to said cover.

9. A filter as claimed in claim 1, wherein said case is provided with integral internal projections at its second end radially extending toward said longitudinal axis and terminating at their ends before the longitudinal axis, said projections defining, in a direction toward said first end, a flat rest surface for said filter element.

* * * * *